(12) United States Patent
Hannigan

(10) Patent No.: US 7,050,549 B2
(45) Date of Patent: May 23, 2006

(54) REAL TIME CALL TRACE CAPABLE OF USE WITH MULTIPLE ELEMENTS

(75) Inventor: Barry Hannigan, Williamstown, NJ (US)

(73) Assignee: Inrange Technologies Corporation, Minneapolis, MN (US)

( * ) Notice: Subject to any disclaimer, the term of this patent is extended or adjusted under 35 U.S.C. 154(b) by 211 days.

(21) Appl. No.: 10/012,464

(22) Filed: Dec. 12, 2001

(65) Prior Publication Data

US 2002/0071530 A1   Jun. 13, 2002

Related U.S. Application Data

(60) Provisional application No. 60/254,839, filed on Dec. 12, 2000.

(51) Int. Cl.
  *H04M 1/24*  (2006.01)
  *H04M 3/08*  (2006.01)
  *H04M 3/22*  (2006.01)

(52) U.S. Cl. ............... 379/32.02; 379/9.04; 379/15.04; 379/18; 379/22; 379/32.05

(58) Field of Classification Search ............... 379/1.01, 379/12, 15.02, 15.03, 15.04, 18, 22, 27.01, 379/32.01, 32.02, 32.03, 32.04, 32.05, 9.01, 379/9.04

See application file for complete search history.

(56) References Cited

U.S. PATENT DOCUMENTS

| | | | |
|---|---|---|---|
| 4,959,849 A | 9/1990 | Bhusri | 379/32 |
| 5,475,732 A * | 12/1995 | Pester, III | 379/32.01 |
| 5,592,530 A | 1/1997 | Brockman et al. | 379/34 |
| 5,712,908 A * | 1/1998 | Brinkman et al. | 379/114.28 |
| 5,793,839 A * | 8/1998 | Farris et al. | 379/32.03 |
| 5,802,145 A * | 9/1998 | Farris et al. | 379/32.03 |
| 5,867,558 A * | 2/1999 | Swanson | 379/9.03 |
| 6,028,914 A * | 2/2000 | Lin et al. | 379/14 |
| 6,104,801 A | 8/2000 | Miloslavsky | 379/219 |
| 6,125,177 A | 9/2000 | Whittaker | 379/243 |
| 6,195,416 B1 * | 2/2001 | DeCaluwe et al. | 379/32.05 |
| 6,327,350 B1 * | 12/2001 | Spangler et al. | 379/115.01 |
| 6,359,976 B1 * | 3/2002 | Kalyanpur et al. | 379/134 |
| 6,400,813 B1 * | 6/2002 | Birnhak | 379/133 |
| 6,614,894 B1 * | 9/2003 | Brockman et al. | 379/112.06 |
| 6,765,990 B1 * | 7/2004 | Freedman et al. | 379/32.05 |

\* cited by examiner

*Primary Examiner*—Binh K. Tieu
(74) *Attorney, Agent, or Firm*—Beck & Tysver, P.L.L.C.

(57) ABSTRACT

A system for testing and monitoring the operation of telephone systems uses a call trace method for capturing messages associated with a phone call. The system can provide an indication as to the time a particular triggering signaling message (e.g., IAM or RLC message) was detected on a link. The present system assembles SS7 signaling messages in real-time. Time stamps are employed in triggers to identify past messages stored in a buffer that are related to the phone call. The instant method of call tracing modifies traditional trigger broadcast transmit-and-receive methods and adds an inter-element manager trigger broadcast capability

31 Claims, 7 Drawing Sheets

REAL TIME CALL TRACE CAPABLE OF USE WITH MULTIPLE ELEMENTS

PRIORITY

This application claims priority to the provisional U.S. patent application entitled, Real Time Call Trace Capable of Use with Multiple Elements, filed Dec. 12, 2000, having a Ser. No. 60/254,839, the disclosure of which is hereby incorporated by reference.

FIELD OF THE INVENTION

The present invention relates generally to load sharing of a telephone system. More particularly, the present invention relates to call tracing on a load sharing telephone system.

BACKGROUND OF THE INVENTION

Links in a telephone networking system, such as an SS7 network, work by load sharing, i.e. each link takes up a known percentage of the total load. Within each link, there are generally five sequences that provide identification/routing information about a signaling message being transmitted over the network. In other words, five messages are used to set-up and release trunk circuits in a service switching point (SSP), namely: Initial address message (IAM), address complete message (ACM), answer message (ANM), release message (REL), and release complete message (RLC). These five sequences or messages make up phone call recognition, as generally known in the area of SS7 networks and the like.

An SS7 network is more formally referred to as a Common

Channel Signaling System No. 7 (i.e., SS7 or C7), which is a global standard for telecommunications defined by the International Telecommunication Union (ITU) Telecommunication Standardization Sector (ITU-T). The standard defines the procedures and protocol by which network elements in the public switched telephone network (PSTN) exchange information over a digital signaling network to effect wireless (cellular) and wireline call setup, routing and control. The ITU definition of SS7 allows for national variants such as the American National Standards Institute (ANSI) and Bell Communications Research (Telcordia Technologies) standards used in North America and the European Telecommunications Standards Institute (ETSI) standard used in Europe. The SS7 and C7 standards listed above are incorporated herein by reference in their entirety.

The SS7 network and protocol are used for: basic call setup, management, and tear down; wireless services such as personal communications services (PCS), wireless roaming, and mobile subscriber authentication; local number portability (LNP); toll-free (800/888) and toll (900) wireline services; enhanced call features such as call forwarding, calling party name/number display, and three-way calling; and efficient and secure worldwide telecommunications.

When a network supervisor wishes to investigate a telephony network interruption or delay, he or she will generally resort to an element manager to perform a "call trace." The element manager or managers may be employed as watchdogs in a telephony system, and the term "call trace" refers to the task of understanding how one connection is made to another within the network channels.

When an IAM message is detected on one link, the processor, sometimes referred to as a probe, detecting the IAM message must send a trigger message to other probes monitoring other links because other signaling messages, ACM, ANM, REL, and RLC messages, may take other link paths due to the load sharing on the SS7 network. After the IAM message containing one of the code—sorigination point code (OPC), destination point code (DPC), or circuit identification code (CIC))—has been identified in a given link set (i.e., all links between, for example, a given SSP and a given STP, see FIG. 2), there is a fixed amount of time to alert all the probes monitoring the network links that further messages relating to the phone call are likely to be passing imminently. When sending the trigger between monitoring processors via a TCP/IP system, there is a possibility that bottlenecks inherent in the TCP/IP system will cause the trigger to be delayed between the processors. Thus, the ACM message, which follows the JAM message by 100 msec typically, may go undetected by the probes.

Thus, monitoring link sets for messages containing a selected code related to a phone call on a link set can be difficult, if not impossible, particularly when multiple link sets must be monitored and/or viewed by an operator. Furthermore, in present systems, the only way to determine the order of various transmissions is to gather signal information from the signaling messages, store the information in a database, and sort through the stored information for purposes of troubleshooting. This process, of course, does not lend itself to real-time call tracing.

Sophisticated telephone network systems have been disclosed and include various mechanisms for troubleshooting inevitable errors, which occur during operation. For example, U.S. Pat. No. 6,125,177 to Whittaker shows a method and an apparatus for enhancing signaling and call routing between local and remote terminals of a telecommunications network defined by a layered hierarchy of protocols and switching between telephony and Internet services.

U.S. Pat. No. 5,592,530 to Brockman shows a general testing and monitoring system using an SS7 network in the operation of a phone system. This reference deals with problems of having data located at two different nodes and provides a link monitoring system located at STP sites.

U.S. Pat. No. 4,959,849 to Bhusri relates to a method and architecture for surveillance of network systems, which permits quality control for the network system utilizing information within message signal units received by processing elements. U.S. Pat. No. 6,104,801 to Miloslavsky relates to a system for call routing telephony where routing protocols are associated with specific levels of one or more system characteristics. Appropriate routing protocols are selected and executed based upon system condition and performance.

SUMMARY OF THE INVENTION

The present invention relates to a monitoring system for a telephony network, such as an SS7 network, that supports real-time call tracing. The monitoring system includes a multi-element manager configuration monitoring telephony nodes in mated relationship to one another. Within the monitoring system, a trigger is issued by a probe detecting an IAM message having a phone number that matches specified criteria. The probe applies a time stamp, corresponding to the time the IAM message was asserted onto the telephony network link, to the trigger to allow element managers and monitoring probes distributed about the telephony system to capture messages stored in local, respective buffers and compare the time stamp in the captured messages to the time stamp in the trigger.

The time stamp also allows probes monitoring signaling messages traveling along telephony network links to: (i) temporarily store all messages in a message buffer, (ii) filter the messages in the buffer to determine which message(s), if any, meet a given signaling information and/or time stamp criteria, and (iii) forward messages, meeting the criteria, to element managers supervising the probes. The time stamp and message buffer combination relaxes the high speed trigger distribution requirement, which is 100 msec, since the determination of whether a signaling message is related to a call beyond the 100 msec requirement at about which an ANM is issued in response to the IAM message. Therefore, call tracing can span multiple element managers. The element manager, having the messages meeting the criteria, then displays the results to an operator in a real-time or pseudo-real-time manner. Alternatively, a remote monitoring station in communication with the monitoring system can be used to display the call tracing information.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED EMBODIMENTS OF THE INVENTION

A description of preferred embodiments of the invention follows.

With the ever-increasing use of the Internet in residential and small business environments comes the increasing use of dial-up access. Dial-up Internet access is (i) creating new challenges for public network providers as a result of increased call holding times, and (ii) creating an inability of network subscribers to have the capability to accept and trace telephone calls.

Although not meant to be limiting, preferably the call tracing processor is a general purpose computer running a suitable operating system. The principles of the present invention are preferably implemented in software supported on the call trace processor and are useful, for example, where the following conditions are met:

1. For each call to be traced, relevant information (for example, called number, calling number, additional caller-entered digits if any) about the call can be made available by the network to the processor quickly enough to be used in deciding call tracing; and 2. The monitoring system is capable of receiving commands from the processor to direct the trace of the call.

In accordance with the principles of the present invention, an operator investigating why a phone call is problematic uses a given element manager in the monitoring system to perform the investigation. Under the auspices of the given element manager, a trigger message issued by a probe detecting phone number criteria entered by the operator is time stamped by the probe detecting the trigger message and broadcast by the probe to its respective element manager. The respective element manager broadcasts the trigger with time stamp to other element managers, which, in turn, send the trigger with the time stamp to respective probes. With the time stamp, each probe knows how much time has elapsed since the message was put onto the link on which the detecting probe monitors. Each probe within the network can then examine messages that arrived before the trigger time stamp. The time stamp, being incorporated in or associated with a trigger, provides a means for the probes to identify which messages are out of order or are still sitting in respective probe buffers. Old messages so discovered are then processed as if in real-time.

Figure 1:
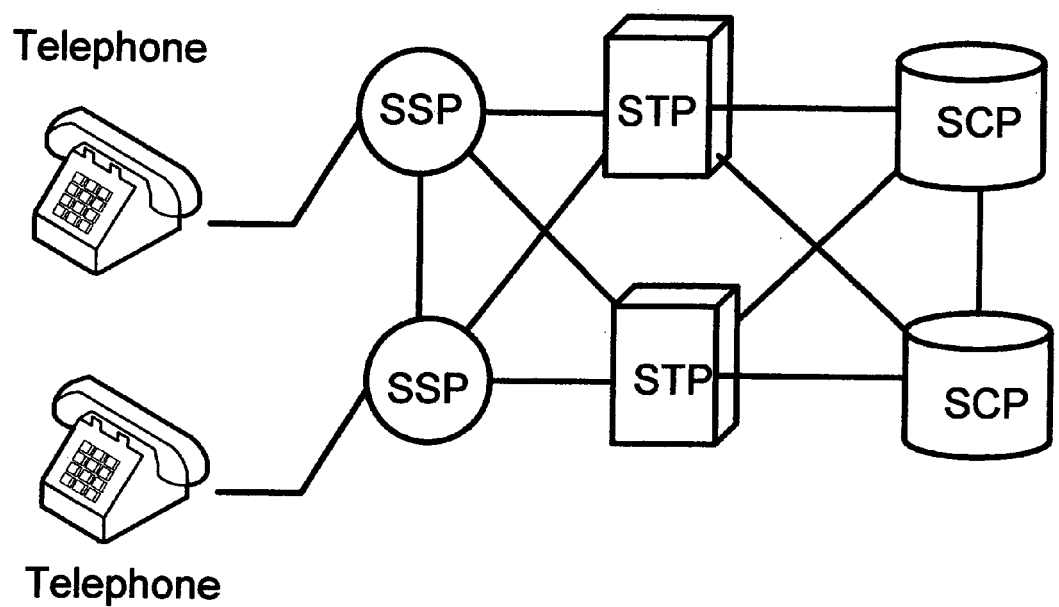
FIG. 1 is a diagram of two nodes in a typical real time call trace system with combined link sets.
Figure 2:
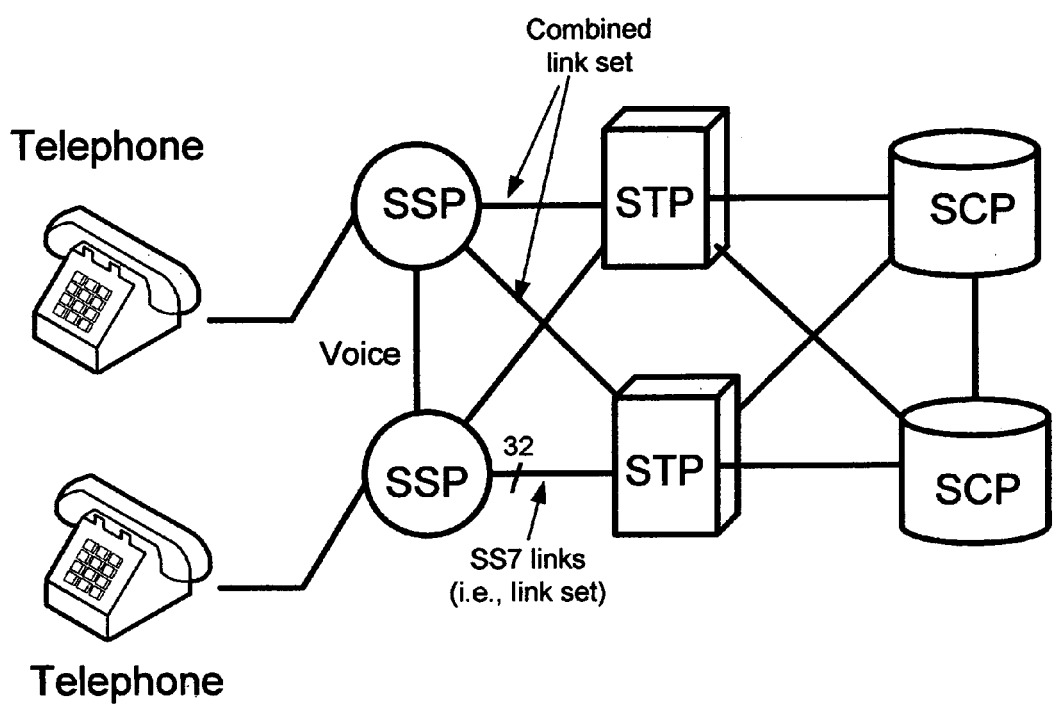
FIG. 2 is a diagram showing typical SS7 signaling points.
Figure 3:
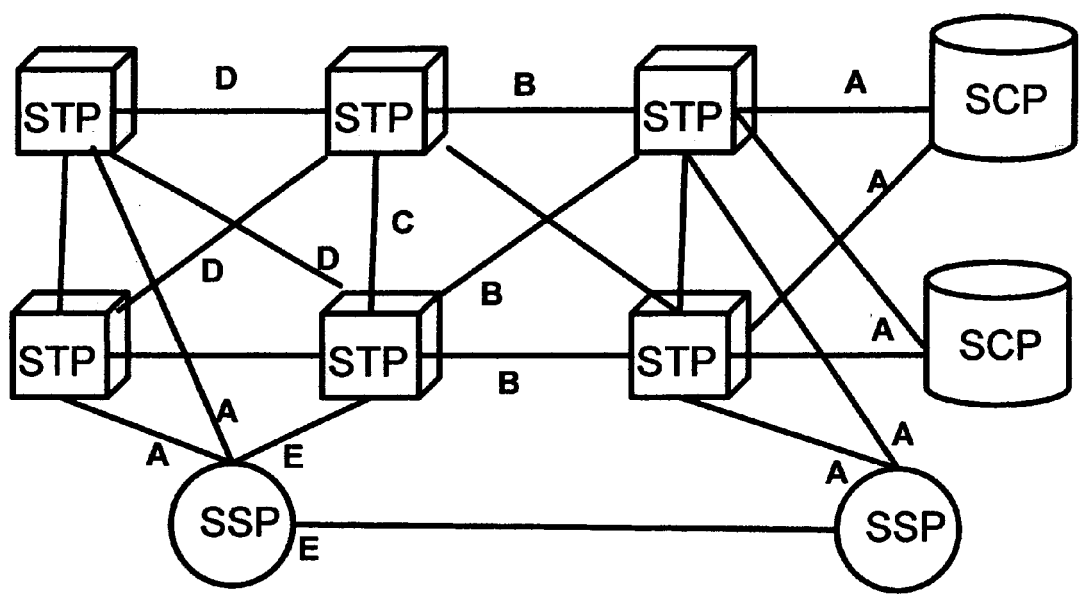
FIG. 3 is a diagram showing SS7 signaling link types.

The SS7 network carries a great deal of information and is critical to the operation of the phone system (see FIGS. 1–v3). If the SS7 network is not functioning, the phone system cannot deliver phone calls. The actual parts of the SS7 network do not provide all the information required in network operations to manage and determine the health and state of the SS7 itself.

Figure 4:
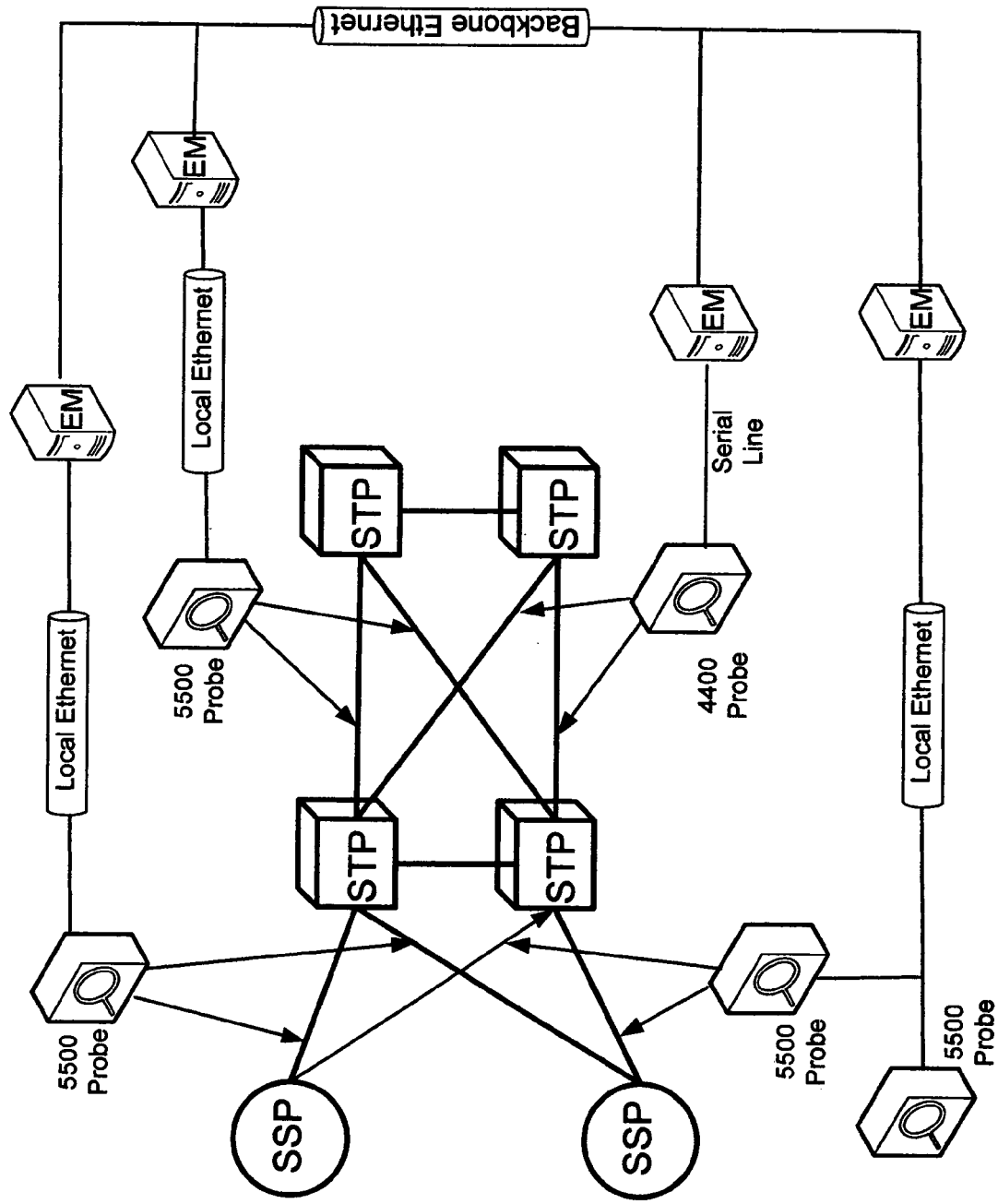
FIG. 4 is a diagram showing an embodiment of interconnections of element managers and probes to an SS7 link set.
Figure 5A:
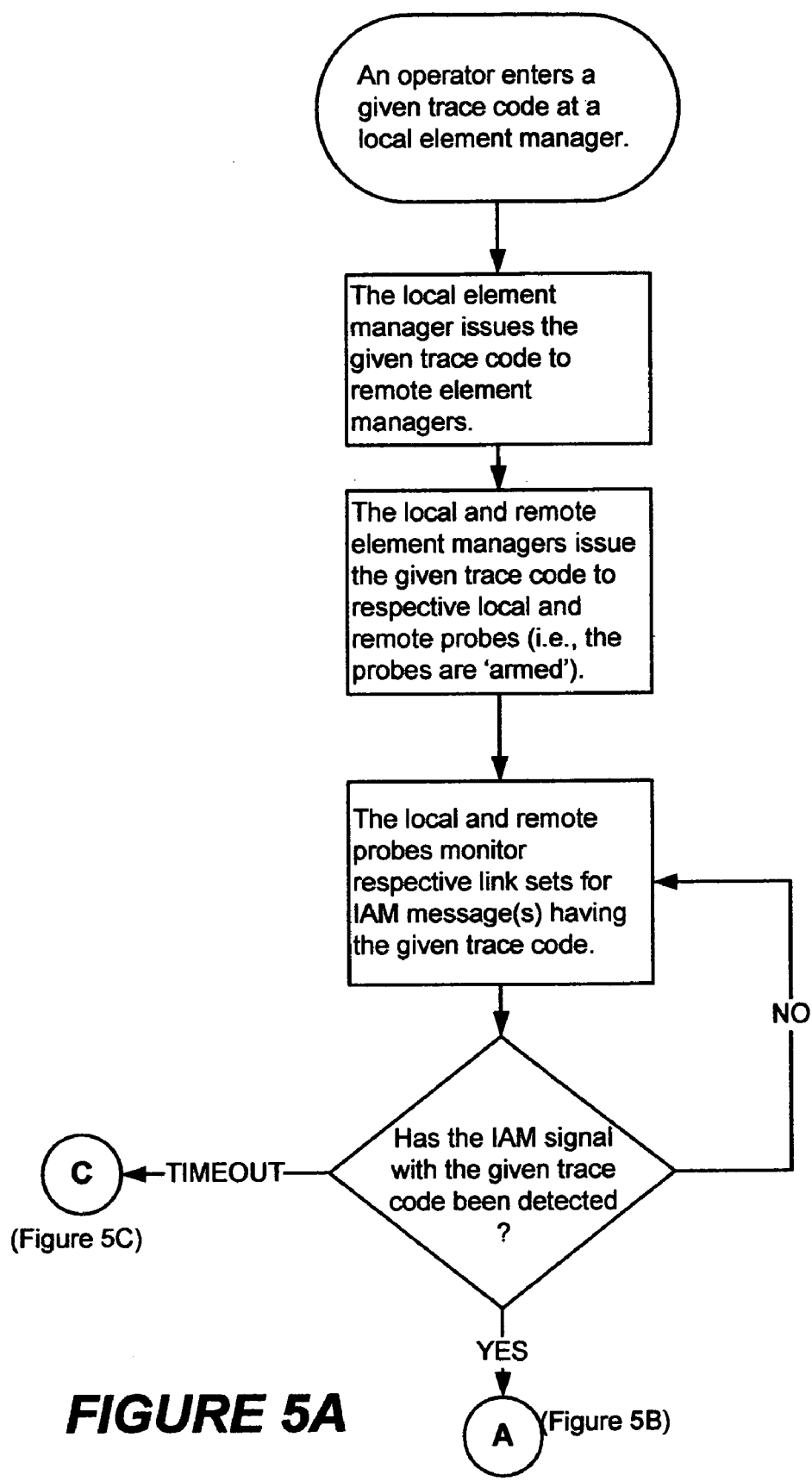
FIG. 5A–5C is a flow diagram of an embodiment of a process executed within the context of the network devices of FIG. 4.
Figure 5B:
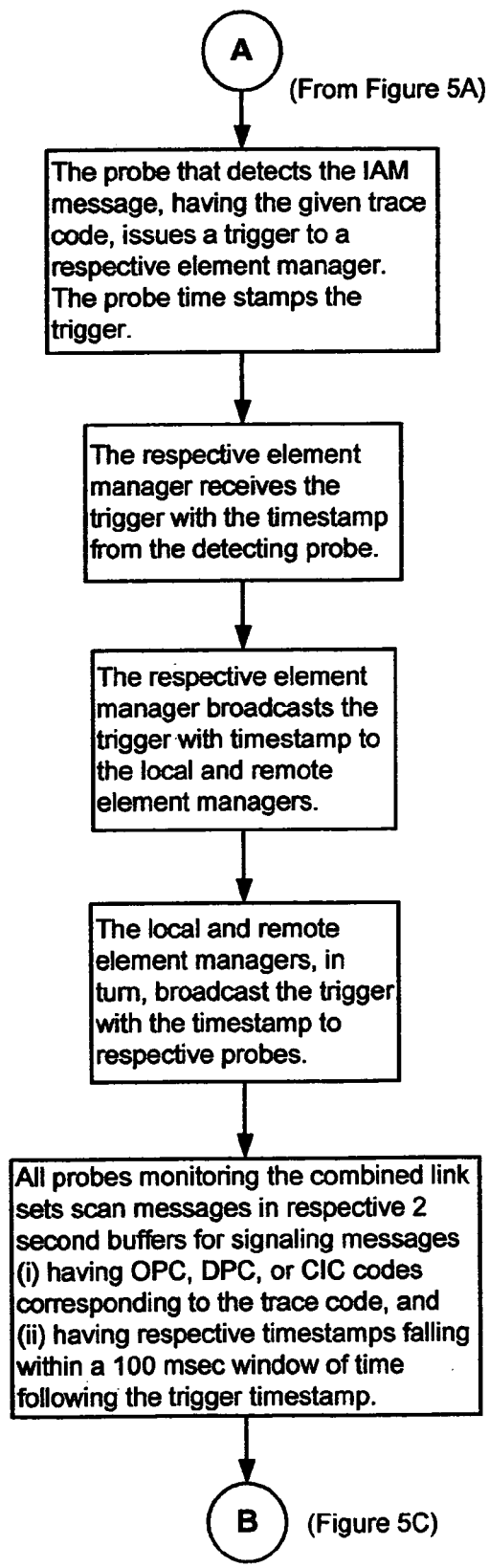
Figure 5C:
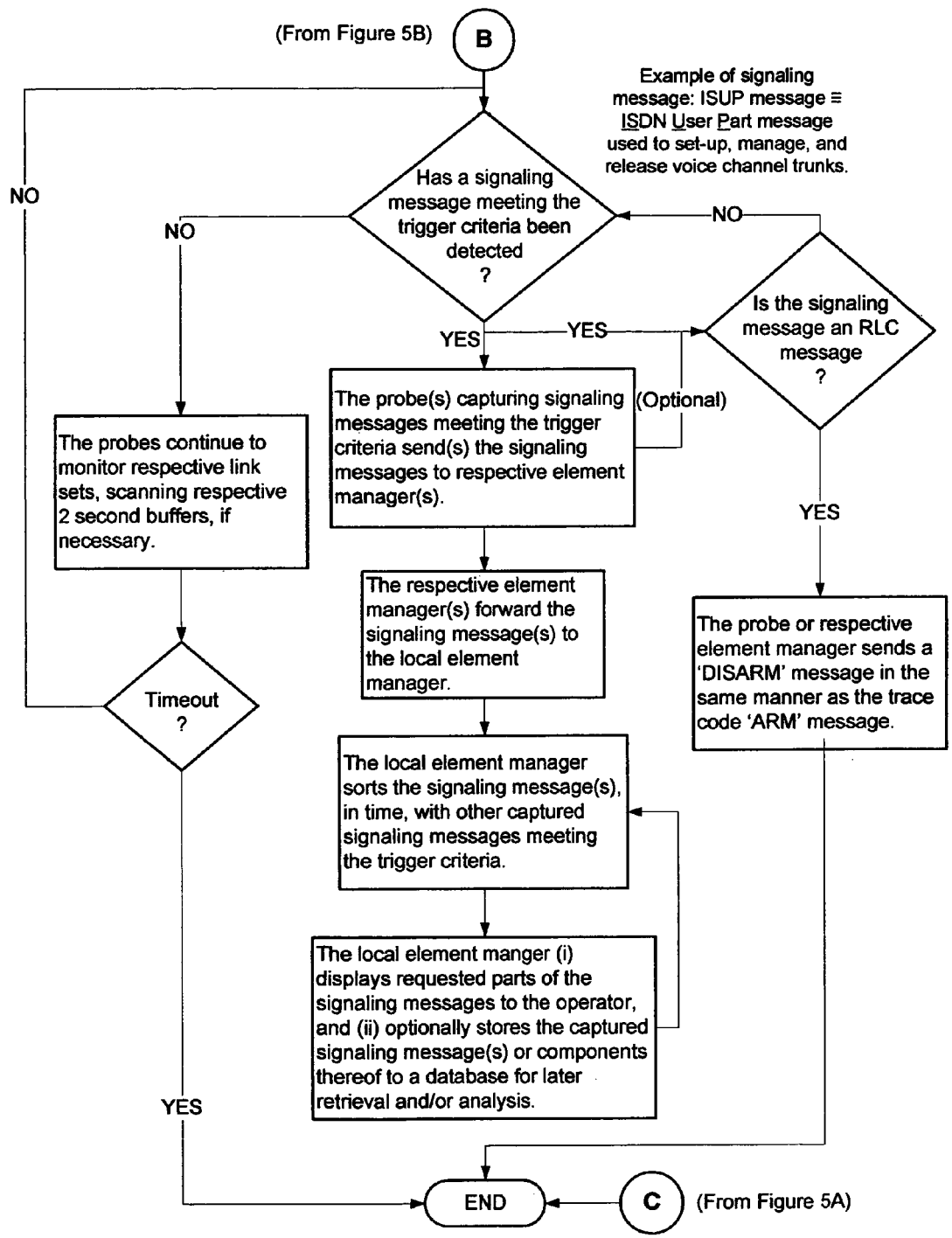

Beyond the traditional SS7 network nodes, such as SSPS, STPs, and SCPs, element managers and probes are used to determine the health and state of the SS7 system. FIG. 4 is a block diagram of an example SS7 network employing several element managers, such as a 7View monitor and probes made by INRANGE Technologies Corp. of Mount Laurel, N.J., and their respective and mutual relationship to the SS7 network. Each element manager is only attached to one or two probes, but each element manager can support more than sixteen probes. Sixteen probes is a limitation based on adding sixteen serial ports to a PC. However, in a TCP/IP embodiment, element managers can support more than 16 probes.

The element managers or client terminals (not shown) attached thereto, may include protocol analysis decoding in a protocol analysis framework to decode messages to text, filter messages based on selected criteria, and filter messages based on belonging to a particular session. This is shown and described in a related U.S. Provisional Patent Application filed Sep. 7, 2000, entitled "Protocol Analysis Framework" by B. Hannigan, the teachings of which are incorporated by reference herein in its entirety.

In one embodiment, if the probes are using network terminal protocol time, then it is possible for the element managers and probes to synchronize to a common clock. For example, when using the common clock, the system can use the two least significant bits of the current second and a 14 bit value that stands for the number of 100 μs periods that have elapsed in the current second. Ideally, the time stamp is small to minimize network traffic.

Besides element managers communicating triggers, and other information to probes within their purview, the element managers can also broadcast the triggers to remote element managers. Once the remote element managers receive the trigger information, they can transmit triggers onto the normal local element manager broadcast mechanism for disseminating trigger information to all subordinate probes.

Some existing call trace schemes work in a multi-element manager configuration only when probes are wired in a manner such that trigger information does not have to be shared between element managers. The instant call trace scheme preferably employs a 100 millisecond guaranteed delivery time for the broadcast trigger information.

A 100 millisecond guaranteed delivery time is possible with dedicated, high-speed voice lines to interconnect the element managers and the probes or other element managers. However, voice lines are expensive since they are high revenue generating lines, whereas TCP/IP communications are inexpensive and, therefore, more agreeable to service providers for communication between and among the element managers and their respective probes. However, the 100 millisecond maximum delivery time cannot be guaranteed in a TCP/IP environment, leaving some call trace systems vulnerable to transit delays causing loss of call tracing integrity.

In order for a call trace to be successful in a multi-element manager configuration without regard to wiring or transit time delays greater than 100 milliseconds, a modified call trace scheme can be employed according to the principles of the present invention, which also permits the use of the wildcard character 'X'. For call trace purposes, leading and trailing X's in a telephone number are discarded. All remaining X's represent exactly one digit. This is an example of a telephone number criterion.

The inter-element manager, trigger broadcast system specifies that each trigger not only be broadcast to each probe under control of a given element manager, it is preferably also broadcast to each other element manager. Each element manager then broadcasts triggers to all probes that it controls (see FIGS. 4 and 5A–5C). Note that "800" numbers and numbers entered using wildcards 15 may be resolved to more than one telephone number, each of which is considered to be one of the four designated for the user. Therefore, "800" numbers and wildcards can diminish the total number of simultaneous call traces possible.

The user must connect links in a particular way or call tracing will not work. The instant call trace algorithm can overcome such limitations in many instances. The tendency of errors occurs in catching extra frames, not missing extra frames. The reason for this is found by going back in time and finding messages that were excluded. A delayed release complete (RLC) trigger excludes a frame from the trace and tells the element manager to drop that frame afterwards. RLC triggers receive a higher priority than IAM triggers. This is due, in part, because all links, which receive an IAM that does not match a phone number being traced, do not send that frame and broadcast a "remove immediately" trigger. The IAM trigger broadcast can be delayed as much as two seconds without loss of frames.

As used herein, articles such as "the", "an" and "a" can connote the singular or plural of the object, which follows.

All documents referred to herein are incorporated herein by reference in their entireties.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A call tracing system for use in a telephony system having nodes in relationship to one another by communication links carrying signaling messages being used to set up voice channels in the telephony system to facilitate calls, the call tracing system comprising:
    a) a first probe that
        (i) monitors respective communication links for a triggering signaling link message related to a given call;
        (ii) upon detecting the triggering signaling link message matching the call, extracts call parameters from the initial triggering signaling link message;
        (iii) issues a trigger including a timestamp, indicating the time of the initial signaling link message, and further including the call parameters in response to detecting the triggering signaling link message related to the given call;
    b) a first element manager coupled to the first probe that receives the trigger from the first probe and broadcasts the trigger; and
    c) a second probe, distinct from the first probe, that
        (i) monitors communication links for signaling link messages,
        (ii) has a buffer for the temporary storage of signaling link messages,
        (iii) receives the trigger,
        (iv) searches and discovers in the buffer signaling link messages that match the call parameters and that were placed in the buffer before the second probe received the trigger, and transmits any matching messages discovered in the buffer to a computing device;
        (v) upon receiving the trigger, watches respective communication links for signaling link messages that match the call parameters and transmits any matching messages, detected passing through the respective communication links, to the computing device without intervening storage in the buffer.

2. The call tracing system of claim 1, wherein a matching message detected by the second probe while watching the respective communication links is received by the computing device before the call ends.

3. The call tracing system of claim 1, wherein any matching messages observed by the second probe while watching the respective communication links is transmitted by the second probe in real time.

4. The call tracing system of claim 1, further comprising:
    d) a second element manager, distinct from the first element manager and coupled to the second probe, that
        (i) receives the trigger from the first element manager and transmits the trigger to the second probe, and (ii) receives a matching message, which was discovered in the buffer or detected by watching the communication links, from the second probe; and (iii) retransmits the matching message to the computing device;

and wherein each probe is coupled to exactly one element manager.

5. The call tracing system of claim 4, wherein communications between at least two element managers are conducted across a wide area network.

6. The call tracing system of claim 4, wherein communications among element managers, and between element managers and probes, are based on the TCP/IP protocol.

7. The call tracing system of claim 4, wherein the computing device transmits a matching message upon receipt to the operator.

8. The call tracing system of claim 1, wherein the computing device broadcasts the telephone number criteria to be traced.

9. The call tracing system of claim 1, wherein the computing device receives a request for a telephone number criteria to be traced from an operator.

10. The call tracing system of claim 1, wherein the computing device is an element manager.

11. The call tracing system of claim 1, wherein the buffer is only searched for matching messages if the time at which the trigger is received by the second probe exceeds the timestamp time by a previously specified amount.

12. The call tracing system of claim 1, wherein the triggering signaling message is an Initial Address Message (IAM).

13. The call tracing system of claim 1, wherein the second probe stops watching communication links for signaling messages matching the call parameters after a previously specified interval beyond the timestamp time.

14. The call tracing system of claim 1, wherein the second probe stops watching for signaling link messages matching the call parameters after receiving a disarming trigger.

15. The call tracing system of claim 14, wherein a disarming trigger is issued by a third, not necessarily distinct, probe upon detection of a Release Call (RLC) message matching the call parameters.

16. A method for call tracing in a telephony system having nodes in relationship to one another by communication links carrying signaling messages being used to set up voice channels in the telephony system to facilitate calls, the method comprising the steps of:

a) entering telephone number criteria to be traced;

b) detecting at a first probe a triggering signaling link message matching the telephone number criteria and extracting call parameters from the triggering signaling message;

c) issuing by the first probe a trigger including a timestamp, which indicates the time of the triggering signaling link message, and further including the call parameters;

receiving a trigger at a first element manager coupled to the first probe;

e) broadcasting the trigger message by the first element manager;

f) placing signaling link messages at a second probe, distinct from the first probe, into a temporary buffer;

g) receiving the trigger at the second probe;

h) checking the buffer for any matching messages that occurred after the trigger message timestamp time but before the trigger was received at the second probe;

i) transmitting matching messages found in the buffer to a computing device;

j) watching respective communication links by the second probe for messages matching the call parameters; and k) transmitting to the computing device messages matching the call parameters that are detected while watching respective communication links by the second probe, without intervening storage of such matching messages in the buffer.

17. The method of claim 16, further comprising:

l) receiving a matching message, which is detected by the second probe passing across the communication links, by the computing device before the call ends.

18. The method of claim 16, wherein transmitting to the computing device messages, which match the call parameters and which are detected while watching respective communication links by the second probe, occurs in real time.

19. The method of claim 16, further comprising:

l) receiving the trigger at a second element manager coupled to the second probe;

m) receiving at the second probe the trigger from the second element manager;

n) receiving at the second element manager a matching message and retransmitting the matching message; and o) receiving at the computing device a matching message from the second element manager;

wherein each probe is coupled to exactly one element manager.

20. The method of claim 19, further comprising:

p) broadcasting by the computing device the telephone number criteria to be traced.

21. The method of claim 20, further comprising:

q) receiving by the computing device the telephone number criteria to be traced.

22. The method of claim 21, further comprising:

r) transmitting by the computing device a matching message upon receipt to an operator.

23. The method of claim 22, wherein the computing device is an element manager.

24. The method of claim 19, wherein communications between at least two element managers are conducted across a wide area network.

25. The method of claim 19, wherein communications among element managers, and between element managers and probes, are based on the TCP/IP protocol.

26. The method of claim 16, wherein checking the buffer for matching messages is only done if the time at which the trigger is received by the second probe exceeds the timestamp time by a previously specified amount.

27. The method of claim 16, wherein the triggering signaling message is an Initial Address Message (IAM).

28. The method of claim 16, wherein the second probe stops watching communication links for signaling messages matching the call parameters after a previously specified interval beyond the timestamp time.

29. The method of claim 16, further comprising:

l) terminating watching for signaling link messages matching the call parameters after the second probe receives a disarming trigger.

30. The method of claim 29, further comprising:

m) issuing a disarming trigger by a third, not necessarily distinct, probe upon detection of a Release Call (RLC) message matching the call parameters.

31. A call tracing system for use in a telephony system having nodes in relationship to one another by communication links carrying signaling messages being used to set up voice channels in the telephony system to facilitate calls, the call tracing system comprising:
- a) a first probe
  - (i) monitoring respective communication links for signaling link messages related to a given call and
  - (ii) issuing a trigger with a time stamp in response to detecting a signaling link message related to the given call;
- b) an element manager coupled to the first probe so as to receive and to rebroadcast the trigger; and
- c) a second probe
  - (i) monitoring communication links for signaling link messages,
  - (ii) having a buffer for the temporary storage of signaling link messages,
  - (iii) receiving the trigger with the time stamp rebroadcast by the element manager, and
  - (iv) examining the buffer to look for signaling link messages that were placed in the buffer before the second probe received the trigger, wherein messages matching a signaling criteria found in the buffer within a time window related to the time stamp are processed as if seen in real time, and wherein the element manager broadcasts trigger information to at least one additional element manager so that any probe can be connected to any element manager without missing any signaling link messages.

* * * * *